3,277,183
PROCESS FOR THE PURIFICATION OF BISPHENOLIC COMPOUNDS
Karl-Heinz Heller, Krefeld, Ludwig Bottenbruch, Krefeld-Bockum, and Hermann Schnell, Krefeld-Urdingen, Germany, assignors to Farbenfabriken Bayer Aktiengesellschaft, Leverkusen, Germany, a German corporation
No Drawing. Filed Dec. 6, 1961, Ser. No. 157,561
Claims priority, application Germany, Dec. 12, 1960, F 32,742
8 Claims. (Cl. 260—619)

The present invention pertains to processes for the purification of bisphenolic compounds. The term bisphenolic compound or bisphenol as used herein is to be understood to include bis(hydroxyaryl) alkanes, cycloalkanes, oxides, sulfides, sulfoxides, and sulfones, all of which contain hydroxyl-substituted aryl radicals each connected through one of its ring-carbon atoms to respectively, a divalent alkylidene, cycloalkylidene, oxygen, sulfur, sulfinyl (—SO—), or sulfonyl (—$SO_2$—) radical. Great difficulties are encountered in achieving a technically advantageous solution of the problem of producing bisphenolic compounds, in such a pure state that they meet the high requirements of purity that have been set for bisphenolic compounds that are intended for use as starting materials in the production of high molecular polycondensation products, such as polycarbonates. For example, distillation of such compounds can be carried out only to a limited extent or not at all, on account of their high boiling points and their thermal instability. When these compounds in crude form are dissolved in equivalent amounts of aqueous alkalies and reprecipitated by acidification, the associated impurities, which are, for example, isomers or other closely related substances, are also precipitated and therefore cannot be separated from the bisphenol in this way. Recrystallization from organic solvents likewise does not achieve the desired purpose unless the recrystallization is repeated many times. However, a process of successive recrystallization involves substantial losses of bisphenol as well as of solvents, and such purification is therefore not only very cumbersome but also too expensive.

However, a process for the production of pure bis(4-hydroxyphenyl)-alkanes which has proved to be technically useful, consisting in dissolving the bis(4-hydroxyphenyl) alkane in hot water containing phenol, cooling the solution, separating the adduct with phenol which precipitates out in crystalline form from the bis(4-hydroxyphenyl) alkane and phenol and isolating the bis(4-hydroxyphenyl) alkane from the latter by separating the phenol bound in the adduct by extraction or distillation. This process is useful only if it is directly combined with the production of the bis(4-hydroxyphenyl) alkane in the presence of appropriate excess of phenol, since in this case it is only necessary to separate the organic layer of the reaction mixture consisting of a solution of the bisphenol in phenol, from the lower salt-containing aqueous layer to saturate it with water and allow it to cool, if desired, after filtration. On the other hand, such a process is comparatively expensive if it is necessary to dissolve previously prepared bisphenols in water-containing phenol in order to form the adduct and subsequently to separate the phenol from the adduct.

It has now been found that crude bisphenolic compounds of the said type or such bisphenolic compounds which require further purification can be obtained in a surprisingly pure state and in an especially simple manner by dissolving the impure compound in hot water, preferably at its boiling point, to which is added or which contains only such a quantity of an alkaline substance that the compound is just dissolved. The hot solution is then filtered, if desired, cooled, and the pure crystals that precipitate are separated from the mother liquor.

It is especially surprising that only a fraction of the amount of alkaline substance required for neutralizing only one hydroxyl group suffices for completely dissolving in hot water bisphenolic compounds which are barely soluble or even insoluble in water. Upon cooling of the solutions, the solubility limit of the bisphenols is rapidly exceeded again so that at room temperature they crystallize out again almost completely.

The following experiment shows that the remarkable increase of solubility of the products in boiling water containing a small amount of sodium hydroxide, for example, according to the process of the present invention is not attributable entirely to salt formation:

In order to dissolve bis(4-hydroxyphenyl) sulfide prepared, for example, by condensation of phenol and sulphur dichloride in the stoichiometrical proportion, completely in water at boiling temperature, 35 volumes of water is required. However, only 3 volumes of a 0.65 percent aqueuos sodium hydroxide solution is required to dissolve the same amount of bis(4-hydroxyphenyl) sulfide. The solvent power of the aqueous sodium hydroxide solution, therefore, is more than ten times as high, yet the amount of sodium hydroxide used equals only about 11 percent of the quantity required for the formation of the monosodium salt.

Even more striking is an experiment with 2,2-bis(4-hydroxyphenyl) propane (bisphenol A), a compound which is not readily crystallized from water. However, when equal parts of bisphenol A and water (1.3 parts by weight of each) are heated to boiling temperature and a 50 percent sodium hydroxide solution is added dropwise, practically all of the bisphenol dissolves after the addition of only 0.02 part by weight of sodium hydroxide. After cooling to room temperature, 96 percent of the bisphenol precipitates in crystalline form.

The quantity of alkaline substance to be added to the hot water which is required for dissolving the bisphenol can easily be ascertained, for example, by adding the alkaline substance or a solution thereof to the mixture of hot water and bisphenol, in the manner of titration in small portions, for example, dropwise, until the product has dissolved except, possibly, for insoluble impurities which, however, are generally easily recognized as such. Incidentally, the amount of alkaline substance to be added depends on the quantity of water. The smaller the amount of water, the greater is the concentration and the smaller is the amount of the basic substance that is required. The proportion of bisphenol to water expediently amounts to less than 1:5. In general, it is advantageous to use water in such a quantity that between about 3 and 50 percent, preferably between about 3 and 25 percent, of the stoichiometric amount of the alkaline substance, referred to one hydroxyl group of the bisphenol, is sufficient.

In some cases it may be advantageous to choose the quantity of basic substance somewhat larger or smaller than would be required for just completely dissolving the bisphenol. Thus, a slight excess of alkaline substance can prevent the precipitation of certain by-products which remain dissolved when the bisphenol is recrystallized. In other cases a slight deficiency of basic substance may prevent certain by-products from dissolving at all so that they can be separated from the hot solution, for example, by filtration or centrifugation.

Normally, the bisphenol is dissolved at boiling temperature, i.e., at about 100° C. By applying excess pressure it is also possible to carry out the process of this invention at higher temperatures. It is obvious that the amount of alkaline substance that is required to dissolve the bisphenol decreases as the temperature rises.

Bisphenolic compounds which can be purified according to the process of the invention are, for example, bis(hydroxyaryl)-alkanes such as 4,4'-dihydroxydiphenylmethane (bis(4-hydroxyphenyl)methane), 1,1-bis(4-hydroxyphenyl) ethane, propane, butane and isobutane, 2,2-bis(4-hydroxyphenol) propane and butane as well as dihydroxydiaryl compounds whose aromatic nuclei are linked by a hetero atom such as bis(4-hydroxyphenyl) ether, sulfide, sulfoxide, and sulfone.

Suitable alkaline substances which may be used for increasing the water-solubility of the bisphenolic compounds are, for example, alkali-metal hydroxides, carbonates and bicarbonates, alkaline-earth-metal hydroxides, ammonia and tertiary amines such as trimethyl and triethylamine, pyridine and so on.

In the case of highly contaminated crude bisphenols it is often advantageous to use alkali-metal carbonate or alkali-metal bicarbonate as alkaline substances and to boil the solution under reflux for some time, for example, ½ to 1 hour. Resinous impurities appear to be hydrolyzed or saponified in this way.

An additional increase of the solubility of bisphenolic compounds in hot water can be achieved in known manner by the addition of water-miscible solvents which have a good dissolving power for bisphenolic compounds. Such solvents are, for example, lower aliphatic alcohols, such as methanol and ethanol, acetone and dioxane. Of course, this method results in reduced yields of recrystallized bisphenol without, in general, leading to an improved purification.

The addition of phenol however presents a further advantage in that the yields of recrystallized bisphenolic compounds are increased. In many cases an even greater purification effect can also be observed.

Recrystallization with an addition of phenol is advantageously carried out in the case of bisphenolic compounds which crystallize out in yields below 95 percent, chiefly between 80 and 95 percent. By the addition of phenol the yield can be increased to more than 95 percent also in these cases. When recrystallizing, for example, 200 grams of bis(4-hydroxyphenyl) sulfide from 600 milliliters of water with the addition of 4.0 grams of sodium hydroxide, the yield is 86–89 percent. By using the same process, but with the addition of 20 grams of phenol, the yield is increased to 96.5 percent.

The quantity of phenol to be added with advantage and depending on the amount of water employed is in general between about 2 and about 20 percent by weight, referred to the bisphenolic compound. The phenol concentration of the aqueous solution should generally not exceed 10 percent.

In general it is advantageous to add a reducing agent to the solution of the bisphenol, in order to prevent losses due to oxygen, especially while the solutions are hot. An alkali-metal sulfite such as sodium sulfite and potassium sulfite, may serve for this purpose. It is ofen advantageous to carry out reactions which proceed in an alkaline medium under a protective blanket of nitrogen.

Bisphenols purified according to the process of the invention are practically free of impurities. Their solidification points are sometimes about 2–3° C. higher than that of bisphenols purified by other methods. Cold solutions of bisphenols in aqueous alkalies are practically colorless as are also their melts if loss due to oxygen is obviated. In some cases it is possible to obtain equally pure products even from crude products containing up to 50 percent of by-products by a single recrystallization according to the process of the present invention.

Even the very low alkali content of bisphenols purified according to the process described hereinbefore may be undesirable for some uses of the bisphenols. Such small residual quantities of alkali can be removed in a simple manner by treatment with between 1 and 5 volumes of hot water, an oil-water two-phase system being thus formed in many cases. For protection against atmospheric oxidation it is expedient to carry out this operation in known manner under a protective blanket of nitrogen, in oxygen-free water or with the addition of stabilizers such as small amounts of hydrazine hydrate.

The following examples are given for the purpose of illustrating the invention:

Example 1

(a) By recrystallization of the reaction product of sulfur dichloride with phenol in toluene there is obtained a yellow-colored bis(4-hydroxyphenyl) sulfide (solidification point 149–150° C.). The product still contains resinous impurities. Solutions of the bisphenol in dilute alkali-metal hydroxide solutions have a yellow color. When melted without a protecting atmosphere of nitrogen, only strongly discolored melts are obtained. Repeated recrystallization from toluene and other organic solvents does not lead to substantial changes in the characteristics of the product.

(b) A mixture of 1 kilogram of the product (solidification point 149–150° C.), 30 grams of sodium hydroxide, 20 grams of sodium sulfite and 3 liters of water is heated under reflux for ½ hour. The product thereupon completely dissolves and the solution acquires a green color. The hot solution is filtered and allowed to cool whereupon colorless crystals separate out. The crystals are filtered off with suction, washed with water until the washings are neutral, and dried at 60–70° C. under vacuum.

Yield: 860–890 grams, colorless crystals, solidification point 153° C., dissolving in alkali-metal hydroxide solutions without coloration. A colorless melt is obtained when the product is melted under a protective blanket of nitrogen.

From the mother liquor is obtained upon acidification 85–110 grams of red-colored bis(4-hydroxyphenyl) sulfide (solidification point 148–150° C.) which can be subjected to further purification in a subsequent recrystallization. The total loss amounts to 2–5 percent.

Example 2

By reacting sulfur dichloride and phenol in a stoichiometrical proportion in, for example, solution in carbon tetrachloride while the reaction mixture is cooled, bis(4-hydroxyphenyl) sulfide together with a substantial amount of by-products such as isomers, bis(4-hydroxyphenyl) disulfide, and resins are obtained.

1 kilogram of the crude product thus prepared having a content of 68 percent of bis(4-hydroxyphenyl) sulfide is suspended in a solution of 150 grams of sodium bicarbonate and 20 grams of sodium sulfite in 3 liters of water and heated to reflux temperature. The product thereby dissolves wtih the evolution of carbon dioxide. The greenish solution thus prepared is heated at its boiling point for ½ hour, then filtered and allowed to cool. The precipitated crystals are filtered, washed with water until neutral and dried at 60–70° C. under vacuum.

Yield: 676 grams of colorless crystals (solidification point 153° C.).

In the present case about 80 grams of sodium bicarbonate are required to dissolve the product. However, the purification effect is substantially lower when only that amount instead of 150 grams is used.

Example 3

A mixture of 107 parts by weight of 1,1-bis(4-hydroxyphenyl) ethane (solidification point 120.4° C.) and 600 parts by weight of water is heated to 100° C. with stirring. 7.5 parts by volume of a 45 percent sodium hydroxide solution (i.e., 5.0 parts by weight of sodium hydroxide) are run into the mixture at this temperature. A clear solution is formed from which the starting compound crystallizes out upon cooling. After filtering off with suction, washing twice with 300 parts by weight of water each time and drying at 80° C. under vacuum, 88 grams, i.e., 82.3 percent of the starting substance is recovered. Solidification point 122.0° C.

*Example 4*

A process is carried out as described in Example 3, but with the use of only 300 parts by weight of water instead of 600 parts by weight. After the addition of 4.0 parts by volume of a 45 percent sodium hydroxide solution (2.7 grams of sodium hydroxide) a clear solution resulted, whereupon no further amount of the sodium hydroxide solution was added. After cooling, the crystallized product is treated as described hereinbefore in Example 3.

Yield: 94 grams, i.e., 87.8 percent of the starting material. Solidification point: 123.0° C.

*Example 5*

A mixture of 121 parts by weight of 1,1-bis(4-hydroxyphenyl) isobutane (solidification point 151.7° C.) and 300 parts by weight of water is heated to 100° C. with stirring. 6.0 parts by volume of a 45 percent sodium hydroxide solution (4.0 grams of sodium hydroxide) are added dropwise at this temperature. A clear solution is formed from which the starting compound crystallizes out upon cooling. The product is treated as described in Example 3.

Yield: 102 grams, i.e., 84 percent of the initial quantity. Solidification point: 153.0° C.

*Example 6*

100 parts by weight of 4,4'-dihydroxydiphenyl-methane (solidification point 157.4°) are heated to 100° C. with the 3 volumes of water. After the addition of 5.5 parts by volume of a 45 percent sodium hydroxide solution (3.7 parts by weight of sodium hydroxide) a clear solution is obtained from which the starting compound crystallizes out upon cooling. It is treated as described in Example 3. 85 parts by weight, i.e. 85 percent of the initial amount, are recovered. Solidification point: 161.1° C.

*Example 7*

A mixture of 121 parts by weight of 2,2-bis(4-hydroxyphenyl) butane and 300 parts by weight of water is heated to 100° C. while stirring. From the clear solution obtained after the dropwise addition of 8.5 parts by volume of a 45 percent sodium hydroxide solution (5.7 parts by weight of sodium hydroxide) the starting compound crystallizes out upon cooling. After working up as described in Example 3, 98 parts by weight i.e., 81 percent of the starting compound, are recovered. Solidification point: 123.7° C.

*Example 8*

This example illustrates how the required amount of sodium hydroxide solution and the yield vary with different proportions of water and bisphenol, taking 2,2-bis(4-hydroxyphenyl)-propane as an example. The experiments are carried out as described above, i.e., bisphenol and water are heated at the boiling point of the solution and sodium hydroxide solution is added dropwise, until a clear solution is formed. The product which crystallizes out upon cooling is filtered off with suction, washed and dried.

The results are reported in the table which follows.

| Bisphenol A, parts by weight | Water, parts by weight | 25% sodium hydroxide solution, parts by weight | Sodium hydroxide, parts by volume | Yield, Percent |
|---|---|---|---|---|
| 137.6 | 800 | 10.95 | 7.3 | 85.7 |
| 137.6 | 400 | 7.9 | 5.3 | 87.3 |
| 137.6 | 300 | 7.2 | 4.8 | 89.0 |
| 137.6 | 200 | 5.5 | 3.7 | 91.6 |
| 137.6 | 100 | 4.0 | 2.7 | 93.6 |

*Example 9*

The following table shows the improvements with regard to purity achieved by recrystallization of bisphenol A from a dilute sodium hydroxide solution. In each case 342 parts by weight of bisphenol A are heated to the boiling point with 900 parts by weight of water. The solution obtained after the addition of 20.1 parts by volume of a 45 percent sodium hydroxide solution is in each case still slightly turbid. In experiments (c) and (d) reported in the table hereinafter the solution was treated with 12 parts by weight of a filter-aid, stirred for a short time and filtered hot. After crystallization, the product was washed successively with 300 parts by volume of water, 300 parts by volume of 0.01 percent hydrochloric acid, and then with water until electrolyte free, after which it was dried at 80° C. under vacuum. These measures including washing with hydrochloric acid are carried out in the absence of air or oxygen.

| Test No. | Solidification point, °C. | Color number | Content of Congeners in Percent | | |
|---|---|---|---|---|---|
| | | | 2,4'-dihydroxy isomer | Trisphenol | Chroman |
| (a)[1] | 152.9 | 1.5 | 5 | 1.7 | 0.3 |
| (b) | 155.1 | 1 | 0.8 | 0.3 | 0.05 |
| (c)[2] | 156.1 | 0.75 | 0.5 | 0.1 | 0.02 |
| (d) | 156.1 | 2.5 | 0.3 | 0.09 | 0.03 |
| (e) | 156.5 | 1.5 | 0.08 | 0.04 | 0.01 |

[1] Starting Material.
[2] Other starting material.

The "color number" referred to in the foregoing table is a numerical value based on a visual comparison of the color of a molten sample of the bisphenol with a series of standard color solutions prepared by diluting a solution of potassium dichromate and cobaltous chloride, to which a value of 4 was arbitrarily assigned. The values decrease with the dilution, in which respect this color number is similar to the iodine color number that is used in comparing the colors of resins.

The subheadings "2,4'-dihydroxy isomer," "Trisphenol," and "Chroman" refer respectively to the compounds known and designated systematically as 2-(2-hydroxyphenyl)-2-(4-hydroxyphenyl) propane, 2,4-bis[2-(4-hydroxyphenyl)propyl)]phenol, and 2,2,4-trimethyl-4-(4-hydroxyphenyl)chroman.

*Example 10*

A stirred mixture of 200 grams of bis(4-hydroxyphenyl) sulfone having a solidification point of 234–236° C. and 400 milliliters of water is treated at reflux temperature with stirring with a 25 percent sodium hydroxide solution, until complete solution has occurred. The amount of sodium hydroxide required for this purpose is 9.0 grams=38 mol percent, referred to one hydroxyl group of the bisphenol sulfone. The product which has crystallized after cooling is filtered off, washed with water until neutral and dried. The yield of colorless crystals of solidification point 242–243° C. amount to 144 grams. 47 grams are obtained from the mother liquor by acidification and can be recycled in another purification so that the total loss amounts to 4.5 percent. For recrystallization of 200 grams of bis(4-hydroxyphenyl) sulfone from water alone there are required 4000 milliliters of water, that is to say that the solubility has been increased ten times, or 5.6 times when taking into account the amount of sulphone corresponding to the sodium hydroxide solution.

*Example 11*

A mixture of 200 grams of bis(4-hydroxyphenyl) sulfide (solidification point 149–150° C.), 20 grams of phenol and 200 milliliters of water is heated to the boiling point. A sodium hydroxide solution having a concentration of 50 percent sodium hydroxide by volume is added dropwise at the boiling temperature, until a clear solution is obtained. The amount of sodium hydroxide solution that is required is 8 milliliters corresponding to 4.0 grams of sodium hydroxide. After cooling, the crystallized product is filtered and washed with water until neutral. The yield of colorless product having a solidification point of 153.5° C. amounts to 193 grams, i.e., 96.5 percent.

We claim:

1. A process for the purification of a crude bisphenolic compound of the group consisting of bis(hydroxyaryl) alkanes, cycloalkanes, ethers, sulfides, sulfoxides, and sulfones, which comprises
    (a) dissolving the said crude bisphenolic compound in hot water at a temperature not in excess of its boiling point containing an amount of a water-soluble alkaline substance of the group consisting of alkali-metal and alkaline-earth-metal hydroxides, and alkali-metal carbonates and bicarbonates that is much less than that required stoichiometrically to convert the bisphenol to its corresponding salt yet is sufficient but not substantially in excess of that required to dissolve completely the bisphenolic compound contained in the crude product to form a clear aqueous alkaline solution at a temperature of approximately 100° C.,
    (b) allowing the hot aqueous solution to cool, and
    (c) subsequently recovering from the cooled solution the crystalline purified bisphenolic compound thus precipitated therein.

2. A process as defined in claim 1 in which the alkaline substance required to prepare the aqueous alkaline solution is added to the hot water containing the bisphenol after it has been heated to its boiling point.

3. A process as defined in claim 1 in which the amount of water that is used is sufficient to form an essentially clear solution of the bisphenol contained in the crude bisphenol with an amount of the alkaline substance between about 3 and about 50 percent of the stoichiometrical equivalent of the bisphenol that is computed as having only one hydroxyl equivalent.

4. A process as defined in claim 1 in which phenol is added to the solution of the crude bisphenol in an amount equivalent to between about 2 and about 20 percent by weight of the bisphenol.

5. A process as defined in claim 1 in which a small amount of a reducing agent is added to the solution prior to the crystallization step (b).

6. A process as defined in claim 5 in which the reducing agent is an alkali-metal sulfite.

7. A process for the purification of crude 2,2-bis(4-hydroxyphenyl)butane which comprises
    (a) dissolving approximately 121 parts by weight of the said crude 2,2-bis(4-hydroxyphenyl)butane in approximately 300 parts by weight of water containing 5.7 parts by weight of sodium hydroxide at a temperature of approximately 100° C.,
    (b) allowing the hot aqueous solution to cool, and
    (c) subsequently recovering from the cooled solution the crystalline purified 2,2-bis(4-hydroxyphenyl)-butane thus precipitated therein.

8. A process for the purification of crude bisphenol A which comprises
    (a) dissolving approximately 137.6 parts by weight of crude bisphenol A in approximately 100 parts by weight of water at a temperature of approximately 100° C. containing approximately 1.0 part by weight of sodium hydroxide,
    (b) allowing the hot aqueous solution to cool, and
    (c) subsequently recovering from the cooled solution the crystalline purified bisphenol A thus precipitated therein.

References Cited by the Examiner

UNITED STATES PATENTS 2,456,500   12/1948   Gilbert et al. _____ 260—609

FOREIGN PATENTS 971,013   11/1958   Germany.

CHARLES B. PARKER, *Primary Examiner.*

DANIEL D. HORWITZ, JOSEPH P. BRUST,
*Examiners.*